Dec. 18, 1945. A. VAN DYCK 2,391,079
HARBOR NAVIGATION SYSTEM
Filed June 30, 1942 2 Sheets-Sheet 1

INVENTOR
ARTHUR VAN DYCK
BY
ATTORNEY

Dec. 18, 1945.     A. VAN DYCK     2,391,079
HARBOR NAVIGATION SYSTEM
Filed June 30, 1942     2 Sheets-Sheet 2
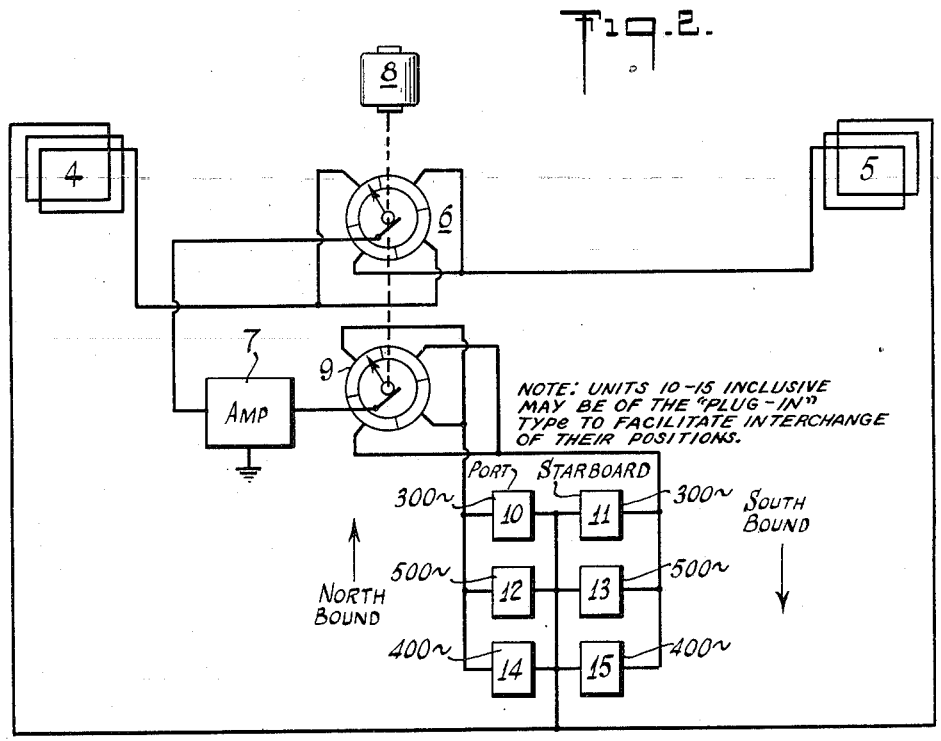
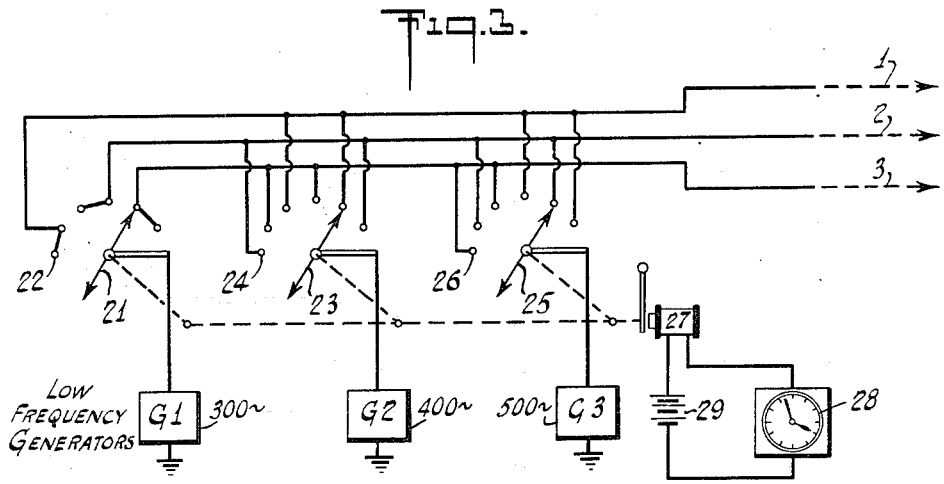
INVENTOR
ARTHUR VAN DYCK.
BY H. G. Grover
ATTORNEY Patented Dec. 18, 1945

2,391,079

UNITED STATES PATENT OFFICE 2,391,079

HARBOR NAVIGATION SYSTEM

Arthur Van Dyck, New York, N. Y., assignor to Radio Corporation of America, a corporation of Delaware Application June 30, 1942, Serial No. 449,109

11 Claims. (Cl. 177—385)

This invention relates to harbor navigation systems and more particularly to a system and a method for guiding ships in channels through harbors and mined areas.

It has been found that a ship can be successfully piloted through a safe channel, use being made of a submerged cable laid on the channel bottom, this cable being energized with a low frequency current. Detecting coils are mounted on the port and starboard sides of a vessel, and these coils are connected to suitable indicating devices. The presence of the cable directly under the keel of the ship is shown by balanced indications derived from the two detector coils.

It is an object of my invention to provide improvements in a harbor navigation system of the type which uses a pilot cable, these improvements being directed specifically to apparatus and a method for both guiding friendly ships and misguiding enemy ships.

It is another object of my invention to provide a pilot cable submerged beneath a ship's channel in combination with detection means on board the vessel, whereby accurate information may be given to the navigator as to the relative position of his ship with respect to mine areas adjacent a safe channel.

It is a further object of my invention to provide a simple harbor channel guiding and misguiding means useful only to friendly ships by virtue of the adoption of a secretly coded schedule for applying different frequencies at different times to each of a number of cables laid partly through a safe channel and partly through a region in which mines have been planted.

The foregoing and other objects and advantages of my invention will become apparent as the detailed description thereof is fully developed hereinafter. This description is accompanied by drawings, in which:

Fig. 2 shows a diagram of suggested apparatus to be employed on shipboard for detecting and indicating the position of a ship with respect to the submerged cables in a given harbor; and Fig. 3 shows a diagram of generators and switches to be used in feeding energy of different frequencies to different cables laid in a harbor.

Figure 1:
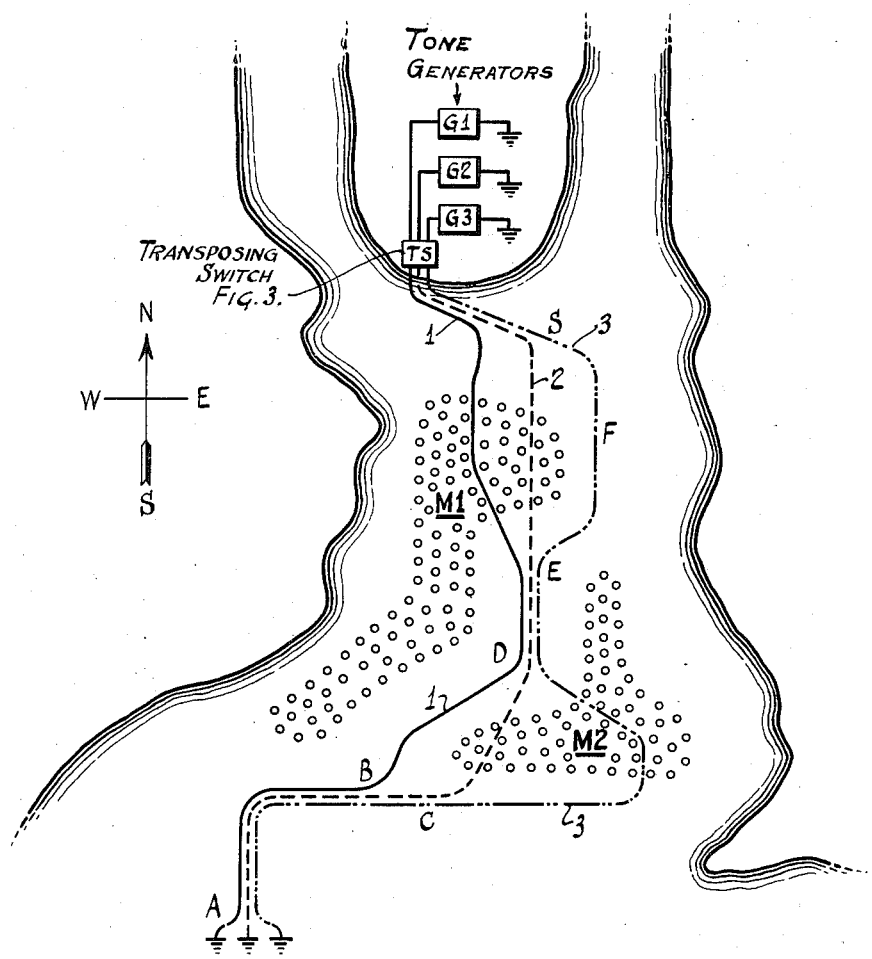
Fig. 1 shows illustratively a map of an imaginary harbor showing regions in which mines have been planted and showing both safe and unsafe channels which have been marked out by the laying of cables.

Referring first to Fig. 1, which, of course, must be understood to be an entirely fictitious showing of a mined region in a harbor, I show three generators G1, G2, and G3 positioned at any suitable point on land and connected respectively to three separate cables laid in the bottom of the harbor. Cable 1 is indicated by a solid line; cable 2 is indicated by a broken dash line; and cable 3 is indicated by a line composed of a sequence of dashes and two adjacent dots. At the entrance to the harbor, I use three cables converged in a region A where they may all be grounded. Each of the generators G1, G2, and G3 has, therefore, an output circuit one terminal of which is grounded.

A safe channel is indicated as one which may be navigated through points A, B, D, and E while following cable 1. Further entrance into the harbor through a safe channel is made by following cable 3 from point E through the region F and thence to a region S which is safely beyond the danger areas.

An enemy ship attempting to enter the harbor, even if equipped with detection devices for picking up a frequency radiated by each cable, would not know which frequency to follow as a guide through the safe channel. At point C, for example, the following of either cable 2 or cable 3 would be such as to guide the vessel into a mined region M2. An enemy vessel not equipped with detection devices would be liable to run into either one of the mined regions M1 and M2. Even assuming that the enemy vessel were to be guided by the frequency radiated by cable 1 through the channel marked by the points A, B, D, and E, a choice of frequencies beyond that point would be liable to misdirect the enemy vessel into mined region M1 since two of the cables 1 and 2 are laid through such a region.

Regions such as that between points D and E, where a plurality of cables is laid in parallel, are useful in preparing a friendly navigator to transfer his choice from one cable to another as a guide through the safe channel. At point E where divergence of the cables takes place (and at similar points if they are provided through a long and tortuous channel) considerable confusion may be presented to an enemy pilot, since his chances are slim for selecting the cable which indicates the safe course.

In Fig. 1, there are two points at which the pilot, in order to follow a safe course, must choose correctly one frequency out of three available. These points of decision may be increased in number if desired. An enemy pilot, relying upon guesswork and upon the law of probabilities, would have a slim chance of selecting the safe course, which chance is based upon the number of decision points. For example, if three cables with three frequencies are used and the number of decision points is four, a pilot ignorant of the proper frequencies to choose, would have one chance in eighty-one of guessing the course correctly. Also, any number of cables may be used, but it is believed that for our Navy purposes a sufficient degree of ambiguity or secrecy is introduced by three cables.

The grounding of the cables at A, or elsewhere, is optional. Return circuits may be used for increasing the efficiency of the working magnetic field. Also, it is optional to lay the return circuits completely outside the navigable waters, or in separate channels intended for guidance or misguidance. Furthermore, a cable circuit may be so laid as to differentiate an incoming channel from an outgoing channel, thus to avoid collisions.

In order to safely guide a vessel through the channel which is reserved for friendly vessels, a simple indicator can be provided on board ship such as will now be described.

Referring to Fig. 2, I show two coils of wire 4 and 5, an amplifier 7, two rotary switches 6 and 9, and indicators 10 to 15 inclusive. The rotary switches, although shown with opposing segments connected in parallel, may have any number of segments thereon, if desired, in order to multiply the frequency of switching one coil and the other alternately into the amplifier 7.

The rotors of switches 6 and 9 may be mounted on a common shaft and driven by any suitable motor 8. The rotor of switch 9 is, therefore, maintained in phase with that of switch 6. Through switch 9 the output circuit from the amplifier 7 may be directed alternately to left and right hand units in each of a number of different frequency indicators. These indicators are shown in two vertical columns, the left hand column being energized by currents which are picked up by the coil 4 on the port side of the vessel, while the right hand column of indicators shows the energies picked up by the coil 5 on the starboard side of the vessel.

While my invention is in no way limited to the use of frequency indicators of the vibrating reed type. I have found that these indicators are very satisfactory when low frequencies are impressed upon the submerged cables. The frequencies employed may be any in the audible range, but practical considerations indicate that the range of about 100 to about 1000 cycles per second is most useful. For the example to be described, 300, 400, 500 cycles per second are used.

The indicators 10 and 11 constitute one pair tuned to a single frequency. The pair of indicators 12 and 13 is likewise tuned to another single frequency. The pair of indicators 14 and 15 is also tuned to a third single frequency. In order to simplify the use of these indicators for piloting through the safe channel, it may be desirable to arrange each pair of frequency indicators as a "plug-in unit." The sockets for such units, although connected in parallel through the distributor switch 9 to the output circuit of the amplifier 7, would have a guiding significance such that when the ship is northbound, that is, when it is entering the harbor, the frequencies relied upon for guidance can be detected by a sequence of responses in the different frequency meters, reading them upwardly as the ship progresses through the channel. Likewise, if the vessel is proceeding outbound or southbound, the responses made by the frequency meters would be read progressively downward.

The reason for arranging the frequency meters as plug-in units is to accommodate the arrangement to variable permutations of frequency allocations to the different cables. It is contemplated that the use of a secret code in applying different frequencies to the respective cables at different times or on different days or weeks would tend to confuse the enemy. Furthermore, if the system were used in several different harbors, with a different frequency sequence code in each, the meters could readily be arranged to suit each harbor in proper sequence.

One illustrative means and method for easily obtaining correct permutational assignment of different frequencies to different cables is shown in Fig. 3. This figure shows three low frequency generators G1, G2, and G3, the output circuit for each of which is respectively connected to a wiper contact on an appropriate bank of a rotary switch. This switch comprises wiper contact 21 associated with a bank of segmental contacts 22; a wiper 23 associated with a bank of segmental contacts 24; and a wiper 25 associated with a bank of segmental contacts 26. The segments 22, 24, and 26 are suitably connected to the cables laid in the harbor channel.

Ordinarily, manual control of switches 21, 23, and 25 will suffice. However, if for any reason, automatic control is desired, for example by a time clock, such arrangement can of course be utilized.

The rotary switch unit comprising the three wiper contacts and their associated banks of segmental contacts may be actuated by a stepping magnet 27 at periodic times, or after considerable intervals of time, say, once a day or once a week according to the requirements for maintaining secrecy of the code system. The switching should not be made so frequent, however, as to be confusing to friendly pilots. The stepping magnet 27 may be energized from time to time by means of a circuit closing device (not shown) in a clock 28. The circuit for the stepping magnet 27 may be energized by any suitable source 29.

In the operation of my invention, I will first show how illustrative conditions may be obtained for safe guidance of a vessel northbound during a period when the rotary switch of Fig. 3 has its wipers 21, 23, and 25 in the position shown. At this time, the 300-cycle frequency output from generator G1 is applied to the cable 3. Generator G2 delivers a 400-cycle output to cable 1. Generator G3 delivers a 500-cycle frequency output to cable 2.

A friendly pilot will have instructions issued to him in advance as to the proper sequence of frequencies to follow, and therefore the proper arrangement of his frequency meters at any given time, or during any particular day. On entering the harbor, it will be seen that the pilot should first follow cable 1 from any point where it is contacted, say, between points A and B, through point D and up to point E. During this part of the passage, the 400-cycle response will be equally indicated on meters 14 and 15, provided the ship is steered to keep directly over the cable.

Assuming that the approach to the harbor is one where the ship first passes over all three cables between points A and B, no difficulty would arise in changing the course so as to continue following cable 1 only from point B to point D. If, however, the approach to the harbor is such that the underlying cables 2 and 3 are indicated without any response to the 400-cycle frequency in cable 1, a danger signal would then be given by meters 10, 11, 12, and 13, or by meters 10 and 11 alone if the vessel were to the right of point C. In either case, a mined region M2 could be avoided by steering the vessel to the right and in a loop so as to approach the harbor entrance for a second time and sufficiently to the west to pick up signals from cable 1.

Assuming now that the safe channel has been followed, up to point D, by noting the response of meters 14 and 15 while the remaining meters are relatively unresponsive, the convergence of all three cables between points D and E will be indicated by substantially equal responses in all six of the meters.

The pilot is thus given ample warning that at point E he should choose and follow the indications made by meters 10 and 11 to the exclusion of the indications made by the other meters. This will guide him through zone F along the channel marked by cable 3, and up to point S where the vessel may safely seek any further destination.

In accordance with a pre-arranged schedule for changing the frequencies applied to different cables, the pilot will re-arrange his frequency meters from time to time so as to be able to follow their responses upwardly when northbound and downwardly when southbound.

Assume now that the rotary switch at the transmitters (Fig. 3) is so set that the wipers 21, 23, and 25 are moved one step clockwise. Then the frequencies applied to the different cables will be as follows: cable 1 carries 500 cycles; cable 2, 400 cycles; and cable 3, 300 cycles. The frequency meters 10 and 11, therefore, remain in the same positions as in the foregoing part of the description. Meters 12 and 14 will be interchanged; likewise meters 13 and 15 will be interchanged. With this set-up, a vessel may safely proceed northbound by following successive responses of the meters in an upward direction. Furthermore, the vessel may safely proceed southbound by following the responses of the meters in a downward direction. Each time a change is made in the frequency allocation to the respective cables, friendly pilots will have instructions to shift their frequency meters so as to follow a uniform guiding schedule for inbound and outbound vessels through the channel. Enemy vessels without knowledge of the code will be highly confused by the changes in frequency applied to the different cables, especially as certain portions of the cables are laid for misguidance through danger zones.

It is apparent that many different arrangements and combinations of cables and frequencies may be used. The guiding and misguiding frequency allocations may be readily changed whenever desired. The number of positions to be occupied by the wipers of the rotary switch need not be the same as shown in the drawings, since that arrangement is merely illustrative of the principle which is preferably adopted.

The rate at which switching is made by the commutator switches 6 and 9 is unimportant. This rate may preferably be lower than the cyclic alternations of current in the cables, provided it is not so slow as to introduce fluctuations in the amplitude of vibration of the reeds in the frequency meters.

One advantage to be derived from the use of tuned reeds is that a zero, or low amplitude, reading always denotes that the ship is remote from the magnetic field of a cable carrying a current of the frequency to which the reed is tuned. If the ship is immediately over the cable, then the two meters having the proper tuning will respond equally at maximum amplitude. If differential volt-meters were to be used in place of the vibrating reeds the disadvantage would exist that a zero response would at certain times indicate a remote position of the ship from the cable, while at other times the same indication would be made when the vessel was immediately over the cable.

While I have illustrated and described one embodiment of my invention, it is, of course, to be understood that variations may be made without departing from the spirit and scope thereof. The claims to follow, therefore, are to be construed as in no way limited to the precise details of the embodiment shown.

I claim:

1. In a system for protecting a harbor against invasion by enemy ships and for protecting friendly ships against the hazards of mined areas in said harbor, where alternating current-carrying cables have been laid on the bottom of a safe channel and also beneath said mined areas, the method which comprises, impressing current of a different frequency on each of said cables, marking at least one part of a safe course by stretches of a plurality of said cables laid closely parallel to each other, marking other parts of said safe course by different ones of said cables, causing at least one of said cables to traverse a mined area in addition to a portion of said safe course, and causing comparable indications to be made on board any of said friendly ships in response to the energy radiated by different cables.

2. The method according to claim 1 and including the step of transposing the frequency assignments to different cables at predetermined times in order to confuse an enemy pilot.

3. In a system for protecting a harbor against invasion by enemy ships and for protecting friendly ships against the hazards of mined areas in said harbor, where alternating current conductors have been submerged along a relatively safe channel and also through mined areas, the method which comprises utilizing the energy radiated by said conductors to locate two certain points along said safe channel between which a plurality of said conductors run closely parallel to each other and utilizing divergent stretches of said conductors to guide those who are informed as to their position in said safe channel, while causing a random following of divergent stretches of said conductors to decoy a ship into one of said mined areas.

4. Apparatus for protecting a friendly ship and for decoying an enemy ship when seeking to enter a harbor, comprising a plurality of submerged current-conducting cables, at least one of said cables being laid partly through a mined region and partly along a safe channel, and portions of at least two of said cables being laid closely parallel to each other, said cables having different portions which are laid through divergent routes, each cable being electrically grounded at one end, means for impressing an alternating current on the ungrounded end of each cable, the frequency of said current being individual to each cable, means including a pair of pick-up coils mounted with one coil on each side of the ship for detecting energy radiations from said cables, an amplifier capable of amplifying the individual frequencies radiated by said cables and having input and output circuits, a set of frequency indicators arranged in pairs, there being a pair individual to the frequency assigned to each cable, and continuously operable switching means for connecting the input circuit of said amplifier alternately to the port and starboard pick-up coils, and for connecting said output circuit synchronously to alternate ones of said indicators in each pair, thereby to produce indications of energy amplitudes as collected by the port and starboard pick-up coils respectively.

5. In a guide system operable by energy radiations from a plurality of submarine cables laid partly through mined regions and partly through a safe shipping channel, where the energy radiated by each cable is of a characteristic frequency, and where each cable has a distinctive course with respect to said mined regions and safe channel, a plurality of pairs of frequency indicators carried on board a ship to be piloted, there being a port indicator and a starboard indicator in each pair, and different pairs being tuned to respective ones of said characteristic frequencies, means including a pair of pick-up coils mounted abeam the ship for sensing the proximity of each cable to the port and starboard sides of the ship respectively, a single amplifier broadly tuned to the band of frequencies which comprehends the frequency of each cable, and switching means operable to intermittently connect the pick-up coil on the port side of the ship through said amplifier to the several port indicators, and to correspondingly connect the pick-up coil on the starboard side of the ship to the several starboard indicators during intervening time intervals, the port and starboard coil connections being of equal duration and at mutually exclusive times.

6. A guide system according to claim 5 and including means for interchanging the positions of the differently tuned indicators.

7. A guide system according to claim 5 and including a plurality of audio-frequency generators, each connected to a respective one of said cables and each adapted to produce a distinguishable frequency.

8. A guide system according to claim 5 and including a plurality of audio-frequency generators for supplying energy of an appropriately distinct frequency to each cable, and switching means operable at predetermined times for interchanging the frequency allotments to the respective cables.

9. In combination, means including a plurality of submarine cables serving as alternating current conductors for defining safe and unsafe shipping lanes in a harbor, certain areas of which have been planted with mines, at least one of said cables being laid partly through a safe lane and partly through a region of mines, means for impressing an alternating current of characteristic frequency upon each of said cables, and means operative at predetermined times for transposing the frequency assignments to different cables.

10. The combination according to claim 9 and including a magnetic wave detection system carried aboard a ship, said system being provided with a pair of induction coils mounted abeam said ship, an amplifier, a plurality of pairs of frequency selective indicating devices, each pair comprising a port-side indicator and a starboard-side indicator, and switching means for alternately connecting said coils through said amplifier to appropriate ones of said devices, all the port-side indicators being so connected at one time and all the starboard-side indicators being so connected at intervening times, whereby the amplitudes of currents of different frequency induced in the port-side coil and in the starboard-side coil may be compared.

11. In a device for safely piloting a friendly ship through a channel bordered by areas in which mines have been planted, a plurality of submerged cables so laid that different ones must be followed through different stretches of the channel, at least one divergent portion of the cable stretches being laid beneath a mined area, thereby being capable of misguiding an enemy ship, at least one of the channel stretches being marked by the presence of a plurality of said cables laid in parallel, means for causing each cable to radiate energy of a distinctive frequency, and frequency-selective responsive means carried aboard a ship for producing indications of the ship's position with respect to each cable.

ARTHUR VAN DYCK.